US007877740B2

(12) United States Patent
Mehta

(10) Patent No.: US 7,877,740 B2
(45) Date of Patent: Jan. 25, 2011

(54) HANDLING CAUGHT EXCEPTIONS

(75) Inventor: Virendra Kumar Mehta, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1591 days.

(21) Appl. No.: 11/152,466

(22) Filed: Jun. 13, 2005

(65) Prior Publication Data

US 2006/0282828 A1    Dec. 14, 2006

(51) Int. Cl.
*G06F 9/45* (2006.01)
(52) U.S. Cl. .................. 717/148; 717/131; 717/140; 717/147; 717/153
(58) Field of Classification Search ........ None
See application file for complete search history.

(56) References Cited

U.S. PATENT DOCUMENTS 7,120,904 B1 * 10/2006 Robison ............... 717/155
7,240,343 B2 * 7/2007 Ogasawara ............ 717/158

* cited by examiner

*Primary Examiner*—Chuck O Kendall

(57) ABSTRACT

Embodiments of the invention relate to exceptions. In a Java embodiment, if the count of a program statement that causes the exception reaches a threshold, then the Java Virtual Machine (JVM) searches for the throw statement corresponding to that program statement. The JVM then identifies the catch clause corresponding to the throw statement, and depending on implementations, the JVM may replace the throw statement with the catch block or replace the throw statement with a jump to the catch block. As a result, in both situations, program execution, when being supposed to execute the throw statement, executes instructions of the catch block, and avoids execution of the throw statement that would invoke the exception handler, which improves system performance.

18 Claims, 15 Drawing Sheets

(200)

TestInputThrows.java

```
public class TestInputThrows {
110A    public static void main (String args[]) throws UserDefinedException
        {
            if (args.length != 1) { throw new UserDefinedException ("See usage"); }
        }
}
```

Figure 1A (100A)

TestInput.java

```
public class TestInput {
        public static void testInput (String inputArray[]) P
            try {
                if (inputArray.length != 1)
110B                throw new Exception ("See Usage");
                if (Integer.parseInt(intputArray[0] > 255)
120B                throw new Exception ("Bad argument");
130B        } catch (Exception e) {
                System.out.println(e);
            }
        }
        public static void main (String args[]) { testInput(args); }
}
```

Figure 1B (100B)

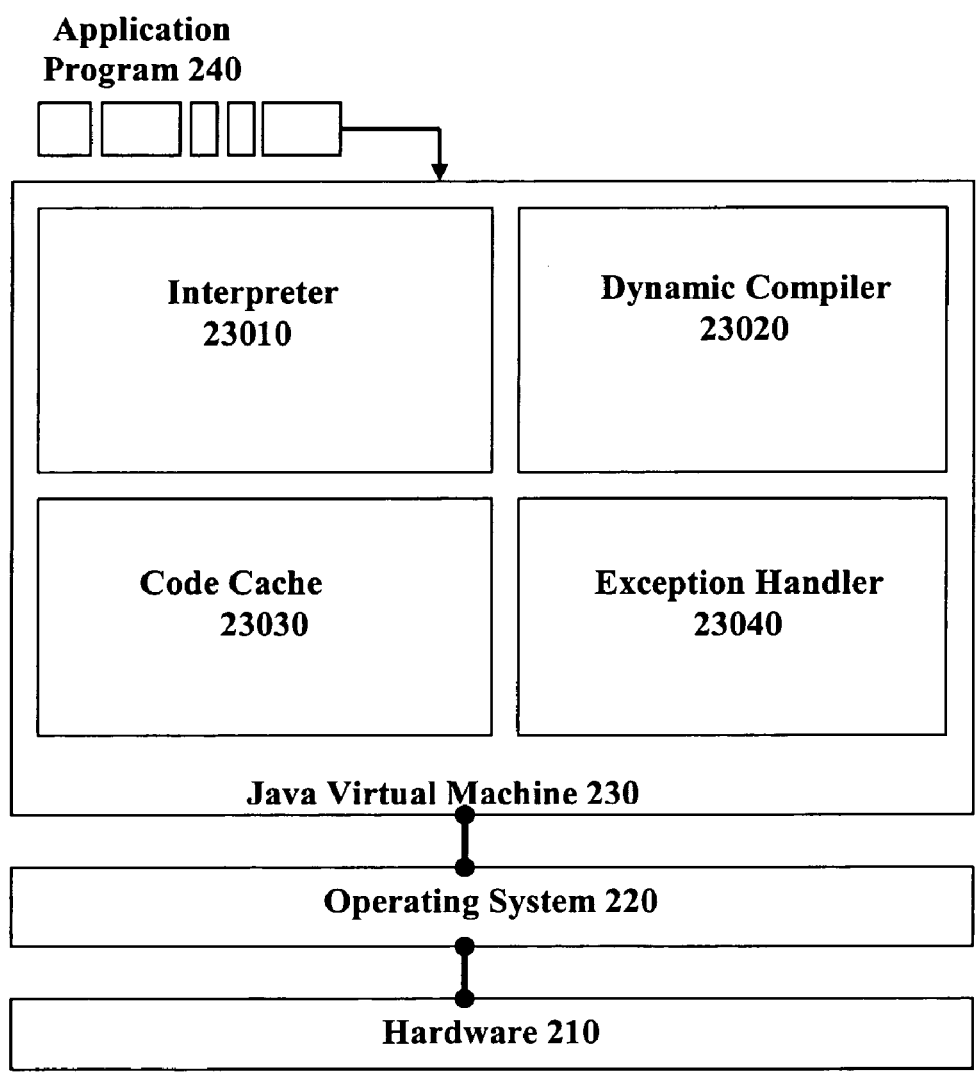
Figure 2 (200)

TestInput.java

```
L1:  public class TestInput {
L2:    public static void testInput(String inputArray[]) {
L3:      try {
L4:        if (inputArray.length != 1)
L5:          throw new Exception ("See Usage");
L6:        if (Integer.parseInt(inputArray[0]) > 255) {
L7:          Exception e = new Exception ("Bad argument");
L8:          throw e;
L9:        }
L10:     } catch (Exception e) { System.out.println(e); }
L11:   }
L12:   public static void main(String args[]) { testInput(args); }
L13: }
```

Figure 3A (300)

TestInput.class public class TestInput extends java.lang.Object{ public static void testInput(java.lang.String[]);
0: aload_0
1: arraylength
2: iconst_1
3: if_icmpeq 16
6: new #2; //class java/lang/Exception
9: dup
10: ldc #3; //String See Usage
12: invokespecial #4;//Method
java/lang/Exception."<init>":(Ljava/lang/String;)V
15: athrow 16: aload_0
17: iconst_0
18: aaload
19: invokestatic #5; //Method
java/lang/Integer.parseInt:(Ljava/lang/String;)I
22: sipush 255
25: if_icmple 38

28: new #2; //class java/lang/Exception
31: dup
32: ldc #6; //String Bad argument
34: invokespecial #4;//Method
java/lang/Exception."<init>":(Ljava/lang/String;)V
37: astore_1
38: aload_1
39: athrow 40: goto 51

43: astore_1
44: getstatic #7; //Field java/lang/System.out:Ljava/io/PrintStream;
47: aload_1
48: invokevirtual #8; //Method
java/io/PrintStream.println:(Ljava/lang/Object;)V 51: return

Figure 3B (300)

410A    Exception table:
        from    to      target    type
        0       40      43        Class java/lang/Exception public static void main(java.lang.String[]);
        Code:
        0: aload_0
        1: invokestatic #9; //Method testInput:([Ljava/lang/String;)V
        4: return
        }

Figure 4A (400A)

Exception table:

|  | from | to | target | type |
|---|---|---|---|---|
| 410B | 8 | 12 | 15 | Class UserDefinedException |
| 420B | 8 | 12 | 26 | Class java/lang/Exception |

Figure 4B (400B)

TestInput.class public class TestInput extends java.lang.Object{ public static void testInput(java.lang.String[]);
Code:
0:   aload_0
1:   arraylength
2:   iconst_1
3:   if_icmpeq 16
6:   new #2; //class java/lang/Exception
9:   dup
10:  ldc #3; //String See Usage
12:  invokespecial #4; //Method java/lang/Exception.<init>:(Ljava/lang/String;)V
15:  athrow 16:  aload_0
17:  iconst_0
18:  aaload
19:  invokestatic #5; //Method java/lang/Integer.parseInt:(Ljava/lang/String;)I
22:  sipush 255
25:  if_icmple 45

28: new #2; //class java/lang/Exception
31: dup
32: ldc #6; //String Bad argument
34: invokespecial #4; //Method java/lang/Exception.<init>:(Ljava/lang/String;)V
37: astore_1
38: getstatic #7; //Field java/lang/System.out:Ljava/io/PrintStream;
41: aload_1
42: invokevirtual #8; //Method java/io/PrintStream.println:(Ljava/lang/Object;)V 45: goto 56

48: astore_1
49: getstatic #7; //Field java/lang/System.out:Ljava/io/PrintStream;
52: aload_1
53: invokevirtual #8; //Method java/io/PrintStream.println:(Ljava/lang/Object;)V 56: return

Figure 4C (400B)

Exception table:
from    to    target    type
0       45    48        Class java/lang/Exception public static void main(java.lang.String[]);
Code:
0: aload_0
1: invokestatic #9; //Method testInput:([Ljava/lang/String;)V
4: return
}

Figure 5A (500)

TestInput.class:

public class TestInput extends java.lang.Object{ public static void testInput(java.lang.String[]);
0: aload_0
1: arraylength
2: iconst_1
3: if_icmpeq 16
6: new #2; //class java/lang/Exception
9: dup
10: ldc #3; //String See Usage
12: invokespecial #4;//Method
java/lang/Exception."<init>":(Ljava/lang/String;)V
15: athrow 16: aload_0
17: iconst_0
18: aaload
19: invokestatic #5; //Method
java/lang/Integer.parseInt:(Ljava/lang/String;)I
22: sipush 255
25: if_icmple 38

28: new #2; //class java/lang/Exception
31: dup
32: ldc #6; //String Bad argument
34: invokespecial #4;//Method
java/lang/Exception."<init>":(Ljava/lang/String;)V
37: astore_1
38: aload_1
39: goto 43

40: goto 51

43: astore_1
44: getstatic #7; //Field java/lang/System.out:Ljava/io/PrintStream;
47: aload_1
48: invokevirtual #8; //Method
java/io/PrintStream.println:(Ljava/lang/Object;)V 51: return Exception table:
| from | to | target | type |
|------|-----|--------|------|
| 0 | 40 | 43 | Class java/lang/Exception |

Figure 5B (500)

```
public static void main(java.lang.String[]);
Code:
0: aload_0
1: invokestatic #9; //Method testInput:([Ljava/lang/String;)V
4: return
}
```

Figure 6 (600)

SimpleTestArray.java (used for illustration)

public class TestArray {
    public static void main(String args[]) {    String test = args[0]; }

Figure 7 (700)

SimpleTestArray.class
  public class SimpleTestArray extends java.lang.Object{public static void main(java.lang.String[]);
  Code:
  0:    aload_0    // Load first variable (args)
  1:    iconst_0   // Load constant 0 to index this array
  2:    aaload     // Load array element based on the index (args[0])
  3:    astore_1   // Save it in the second variable (test)
  4:    return

Figure 8 (800)

SimpleTestArray.class
  public static void main(java.lang.String[]);
    Code:
    0: aload_0    // Load first variable (args)
    1: iconst_0   // Load constant 0 to index this array
    1.5: Is the array length at least 0 (iconst_0)? If not, throw ArrayIndexOutOfBoundsException, otherwise continue
    2: aaload     // Load array element based on the index (args[0])
    3: astore_1   // Save it in the second variable (test)
    4: return
}

Figure 9 (900)

TestArray.java
  public class TestArray {
  public static void main(String args[]) {
    String test;
    try { test = args[0]; }
    catch (ArrayIndexOutOfBoundsException ex) { test = "empty"; }
  }

Figure 10 (1000)

TestArray.class
  public class TestArray extends java.lang.Object{ public static void main(java.lang.String[]);
  Code:
  0: aload_0
  1: iconst_0
  2: aaload
  3: astore_1

4: goto 11

7: astore_2
  8: ldc #3; //String empty
  10: astore_1

11: return

Exception table:

from  to   target   type
  0     4    7        Class java/lang/ArrayIndexOutOfBoundsException
  }

Figure 11 (1100)

0: aload_0   // Start of try block
1: iconst_0
1.5: If array length is at least 1,
1.6 then goto statement 2
1.7 else go to statement 4.5
2: aaload
3: astore_1

4: goto 11   // End of try block 4.5: create new ArrayIndexOutOfBoundsException
4.6: athrow
7: astore_2   // Start of catch block
8: ldc #3; //String empty
10: astore_1   // End of catch block 11: return

Figure 12 (1200)

0: aload_0   // Start of try block
1: iconst_0

1.5: If array length is at least 1,
1.6 then goto statement 2
1.7 else go to statement 4.5

2: aaload
3: astore_1

4: goto 11   // End of try block 4.5: create new ArrayIndexOutOfBoundsException
4.6: astore_2
4.7: ldc #3
4.8: astore_1

4.9: goto 11
goto
7: astore_2   // Start of catch block
8: ldc #3; //String empty
10: astore_1   // End of catch block 11: return

Figure 13 (1300)

0: aload_0   // Start of try block
1: iconst_0

1.5: If array length is at least 1,
1.6 then goto statement 2
1.7 else go to statement 4.5

2: aaload
3: astore_1

4: goto 11   // End of try block 4.5: create new ArrayIndexOutOfBoundsException
4.6: goto 7

7: astore_2   // Start of catch block
8: ldc #3; //String empty
10: astore_1   // End of catch block 11: return

Figure 14 (1400)

HANDLING CAUGHT EXCEPTIONS

BACKGROUND OF THE INVENTION

The Java programming language provides an exception mechanism that makes programming easier. A piece of code would throw an exception if there is an unexpected situation. Most of the time, exceptions occur when there are errors and the programmers use the catch clause having prepared code to quit gracefully and emit a warning to aid debugging. Generally, the Java Virtual Machine (JVM) operates under the assumption that exceptions are rare and unexpected.

Programmers can use the base Exception class or derived classes provided in the Java application program interfaces (APIs), or define their own exception classes. FIG. 1A shows an example in which in the method main( ), the programmer, on line 110A, throws an exception while declaring the method. FIG. 1B shows an example in which the programmer allows the method TestInput( ) to throw an exception on lines 110B and 120B, and includes a catch command on line 130B to catch the exception.

Because the JVM does not allow access to an array with an index value below or above the range corresponding to the allocated size of the array, the JVM automatically detects the array-index overflows and throws an ArrayIndexOutOfBoundsException (AIOOBE) when such situation arises. Further, Java programmers do not need to check for a null pointer because the JVM would insert such a check and throw a NullPointerException (NPE) if the pointer reference is null, e.g., 0. In the case of AIOOBE and NPE, the programmer is not required to add an explicit catch clause or declaration with the throw clause as in the example of FIG. 1A and FIG. B. However, the programmer would add such a clause to catch such exceptions if desired.

Certain programming methodologies can lead to a lot of exceptions being thrown. For example, when a programmer writes code for a particular situation thinking exception situation will be rare and handles it, but it turns out that exceptions occur quite often in some other execution condition which was not tested; when a programmer explicitly writes code using exceptions as a way to handle control flow and keep the code readable and clean, etc. However, excessive exceptions can lead to severe performance problems. For examples, some JVMs, which compile the bytecodes into native code after they reach a threshold of interpreting, leave the catch clauses uncompiled to keep the code-cache small. In these cases, when there is an exception, the control transfers from the compiled code to the exception handler in the runtime environment of the JVM which then passes the control to the interpreter to interpret the catch clause instructions. As a result, the entire transition process can be so costly that the JVM may decide to mark that method non-compilable and only interpret it. Consequently, the application performs much worse if the method is executed quite frequently in the interpreted mode, which, by its nature, performs poorly as compared to the compiled mode.

SUMMARY OF THE INVENTION

Embodiments of the invention relate to exceptions. In an embodiment related to the Java environment, the exception handler updates the count of the throw statement that throws the exception every time the exception handler is invoked. If the count corresponding to a statement reaches a threshold, then the JVM analyzes the throw statement and identifies the corresponding catch. Depending on implementations, the JVM may replace the throw statement with the catch block or replace the throw statement with a jump to the catch block. As a result, in both situations, program execution, when being supposed to execute the throw statement, executes instructions of the catch block, and avoids execution of the throw statement, which improves system performance.

BRIEF DESCRIPTION OF THE DRAWINGS

The present invention is illustrated by way of example, and not by way of limitation, in the figures of the accompanying drawings in which like reference numerals refer to similar elements and in which:

FIG. 1A shows an example in which a method throws an exception while declaring that it will do so in the method definition with the throws clause.

FIG. 1B shows an example in which a method throws an exception and includes a "catch" command to catch the exception.

FIG. 2 shows an illustrative system upon which embodiments of the invention may be implemented.

FIGS. 3A and 3B show an illustrative Java source code (300), in accordance with an embodiment.

FIG. 4A shows textual byte code corresponding to the source code of FIG. 3, in accordance with an embodiment.

FIGS. 4B and 4C show an exemplary exception table having two catch clauses and textual byte code.

FIGS. 5A and 5B show textual byte code in accordance with a first embodiment being applied to the byte code of FIG. 4A.

FIG. 6 shows textual byte code in accordance with a second embodiment being applied to the byte code of FIG. 4A.

FIG. 7 shows a Java source code related to array index out of bound exception, in accordance with an embodiment.

FIG. 8 shows textual byte code corresponding to the Java source code of FIG. 7, in accordance with an embodiment.

FIG. 9 shows textual byte code with the insertion of boundary check by the Java Virtual Machine to textual byte code of FIG. 8, in accordance with an embodiment.

FIG. 10 shows a source code with a try-catch block inserted into the source code of FIG. 7, in accordance with an embodiment.

FIG. 11 shows textual byte code corresponding to the source code of FIG. 10, in accordance with an embodiment.

FIG. 12 show textual byte code with the insertion of boundary check by the Java Virtual Machine to textual byte code of FIG. 11, in accordance with an embodiment.

FIG. 13 shows textual byte code 1300 corresponding to byte code 1200 as a result of using an embodiment of the invention.

FIG. 14 shows textual byte code 1400 corresponding to byte code 1200 as a result of using another embodiment of the invention.

DETAILED DESCRIPTION OF VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Overview

FIG. 2 shows an illustrative system 200 upon which embodiments of the invention may be implemented. System 200 includes hardware 210, an operating system 220, a Java Virtual Machine (JVM) 230, and a program application 240.

Hardware 210 and operating system 220 provide the platform based on which JVM 230 executes program application 240.

Program application 240 includes a plurality of code sequences, each of which is formed by an entry point and at least one exit point. Examples of a code sequence include a function in the C language, a method in the C++ or Java language, a procedure in the Pascal language, etc. Generally, programmers write programs in the Java source code included in the java file. A static Java compiler, e.g., the javac (not shown), translates the source code into byte code included in the .class file, which is run by JVM 230. Because byte code is in binary and thus not easily understood, figures in this document show textual representation of byte code, which may be referred to as "textual byte code" for illustration purposes. Further, in this document, textual byte code is used interchangeably with byte code.

In an embodiment, a data structure stores data keeping track of exceptions that exception handler 23040 has been invoked for. This data structure also stores data related to the method causing the exception. For illustration purposes, this method is referred to as the exception method. Examples of data stored in relation to the exception method include whether the method has a compiled version in code cache 23030, the location of the throw statement, the location of catch clause(s) corresponding to the throw statement, whether the catch clause should be compiled, etc. A catch clause refers to instructions associated with the "catch" statement, and may be known as a catch block. Depending on implementations, this data structure is modified from the data structure commonly found in the JVM that is associated with a method or may be independent of that data structure. However, embodiments of the invention are not limited to how the data structure is formed. In an embodiment, for every method which has a try-catch block, there is an exception table, which shows the range of instructions for which there is a try block and then for each such try block, shows the target catch block address for a particular exception.

JVM 230 is a software implementation that allows Java byte code included in the class file to be run on hardware platform 210 in conjunction with operating system 220. JVM 230 includes an interpreter 23010, a dynamic compiler 23020, a code cache 23030, and an exception handler 23040. JVM 230 may also be referred to as an execution or run time environment. In various embodiments, JVM 230 and/or its components is modified to include computer instructions to perform techniques in accordance with embodiments of the invention.

Interpreter 23010, during program execution, translates byte code of application 240 into low level-machine format or internal representation. Interpreter 23010 evaluates a code sequence to decide whether such code sequence should be compiled, and, if so, enables this code sequence to be dynamically compiled by dynamic compiler 23020. Alternatively speaking, interpreter 23010 determines whether a code sequence is "hot," so that the sequence can be compiled and executed in the compiled form instead of in the interpreted form because executing the compiled code runs faster than executing the interpreted code. In an embodiment, interpreter 23010 uses a threshold to determine whether a code sequence is hot or not. Interpreter 23010 causes execution of a compiled version of a code sequence if such version exists in code cache 23030.

Dynamic compiler 23020 generates optimized code sequences corresponding to the code sequences of application 240 while application 240 is being executed by interpreter 23010 in conjunction with JVM 230. The generated code is stored in code cache 23030, and subsequent invocations of the same code sequence prompt a query of code cache 23030 for the existence of an optimized version of the same code. If such a compiled/optimized version exists, then it is executed, else the incoming code sequence is interpreted by interpreter 23010. During execution, compiler 23020 may compile and recompile a code sequence several times to further optimize this code sequence. Compiler 23020 generates native code, and, upon generation of the code, further executions of a sequence of code are carried out in this native code.

Code cache 23030 stores native code generated by compiler 23020.

Exception handler 23040 handles tasks related to exceptions including, for example, analyzing the type of exception that is thrown and looking for the appropriate catch clause in the enclosing blocks of the same method, or by unrolling the call-stack to find a catch block in a calling method, and transferring control to that catch block. Exception handler 23040 commonly found in JVMs is modified to include program instructions that perform techniques in accordance with embodiments of the invention, as appropriate. For example, exception handler 23040 is modified to include a table that has a row for each throw statement in program application 240, and updates the count for that row when an exception comes from that statement. In effect, the table keeps a count of invocations from that throw "site." When exception handler 23040 is invoked, it is passed the line number corresponding to the original byte code and the name of the exception method. Exception handler 23040 then searches for the method name in the data structure to get to the exception table and using the line number, passes control to the corresponding catch block for that exception. If exception handler 23040 cannot find an exception table or the appropriate exception type listed in the exception table, then exception handler 23040 unwinds the call stack to search in the parent calling method(s).

Examples

FIGS. 3A and 3B show an illustrative Java source code 300 included in TestInput.java file, in accordance with an embodiment. TestInput.java could be application 240 or part of application 240. In this example, method testInput( ) and main( ) could be exception methods as exception may occur in these two methods. FIG. 4A shows textual byte code 400A wherein byte code of textual byte code 400A is converted from source code 300 by, e.g., the static compiler javac. In FIG. 4A, line 410A shows an exception table which indicates that if an exception is thrown between byte codes 0 to 40, then control is passed to byte code 43. Byte codes 0-40 correspond to the try clause, e.g., lines L3-L9 of FIG. 3, and byte code 43 represents the catch clause on line L10 of FIG. 3A. If there is no exception, execution control skips the catch clause by jumping to the return statement on line 51, through the goto command on line 40. Those skilled in the art will recognize that exception table at line 410A shows only one line 420A having one "from," "to," and "target" value because source code 300 includes only one catch clause at line L10 of FIG. 3A. However, if there are more than one catch clause, e.g., N catch clauses, then there would be N lines with N corresponding values for "from," "to," and "target." If all the catch clauses are for the same try block, then in the exception table all the entries would have the same 'from' and 'to' values, but different target values for different exception types. FIG. 4B shows an exemplary exception table 400B that includes two lines 410B and 420B corresponding to two catch clauses (not shown). At line 410B, if a "user-defined" exception occurs between byte codes 8 and 12, then, execution controls is directed to byte code 15. In contrast, if a "system" exception occurs between the same byte codes 8 and 12, then execution control is directed to byte code 26.

Embodiments of the Invention

Embodiments of the invention relate to handling exceptions if such exceptions are "excessive." That is, if the exceptions are invoked more times than a threshold. In various embodiments, when exception handler 23040 is invoked, it updates the count of the clause that causes the exception, and records this information in the data structure of the exception method. If such a count exceeds a threshold, then exception handler 23040, in conjunction with JVM 230, identifies the "throw" clause. For illustration purposes, this threshold is referred to as the exception threshold. Depending on implementations, the exception threshold varies and may be selected based on business decisions including degradation of system performance. Information related to the throw clause is usually passed to exception handler 23040 when it is invoked. The throw clause could be generated implicitly by JVM 230, e.g., in the case of AIOOBE and NPE, or coded explicitly by programmers. From the identified throw clause, JVM 230 identifies the corresponding catch clause, e.g., using the exception table. In the example of FIGS. 4A, 4B and 4C, the catch clause starts at byte code 43, which is the "target 43" of the exception table on line 410A, and ends at byte code 48. If exception handler 23040 is invoked for the athrow statement in line 15 of FIG. 4C, it looks for entries in the exception table that have a range so that line 15 would fall in that range. On finding it in the very first row (0 to 40) it looks for the exception type. Since in this case, the exception type java/lang/Exception matches that thrown by athrow as seen in statement 14, it chooses the target address 43 to transfer control to. JVM 230, via its appropriate components, then "patches" the code, i.e., generates related code so that, when the exception is supposed to be thrown, directly executing the catch block, instead of throwing an exception, is performed. JVM 230 may copy the instructions of the catch clause in place of the throw statement, or, alternatively, replace the throw statement with a jump instruction, e.g., "goto" to direct execution to the catch block when appropriate. Generally, the catch clause is easily copy-able and thus copied when the catch block is followed by another catch or final block or its end also marks the end of the exception method. In other cases, execution follows the end of the catch block and copying it may mean copying the entire code until the end of the exception method, and therefore directing execution, e.g., with a goto statement, would be used. Further, directing instructions to the catch clause normally works well in situations where there are various throw statements and/or there is a lot of code in the catch clause because copying the code in such situations could be very inefficient.

In the embodiment of system 200, e.g., one with a dynamic compiler 23020, dynamic compiler 23020 is modified so that patching the code may be done in the native representation code. The catch clause corresponding to the throw statement is also compiled. Depending on situations, the exception method is compiled, and the exception threshold is used to force compilation of this exception method. In an embodiment, JVM 230 causes the exception method to be (re)compiled by marking it invalid in code cache 23030 and placing it in the compiler queue so that the exception method is (re) compiled when appropriate. Once this exception method is recompiled, JVM 230 modifies the recompiled code for patching purposes, e.g., by either copying the catch block or directing execution to execution of the catch block in accordance with embodiments of the invention.

In embodiments that perform interpretation only, e.g., when dynamic compiler 23020 is de-activated or does not exist in system 200, interpreter 23010 invokes exception handler 23040 when interpreter 23010 encounters a throw statement. Interpreter 23010 then identifies the throw clause, the catch clause, etc., and patches the code as described above using internal representation of the byte code of the class files in JVM 230's memory.

Applications

FIGS. 5A and 5B show textual byte code 500, in accordance with a first embodiment being applied to byte code 400A of FIG. 4A. In byte code 500, JVM 230 has replaced the two instructions aload_1 and athrow on lines 38 and 39 of byte code 400A with the code from the catch block from lines 43 to 48.

FIG. 6 shows textual byte code 600, in accordance with a second embodiment being applied to byte code 500 of FIG. 4A. In byte code 600, JVM 230 has replaced the athrow statement on line 39 with the goto statement to the start of the catch block on line 43.

Examples Related to AIOOBE

FIG. 7 shows a Java source code 700 related to AIOOBE, in accordance with an embodiment. FIG. 8 shows a textual byte code 800 corresponding to source code 700. In this byte code 800, there is no explicit exception code. However, invoking the class SimpleTestArray without passing any argument would cause an AIOOBE because JVM 230 checks for the array bounds before an array access. FIG. 9 shows textual byte code 900 corresponding to byte code 800, however, with the insertion of a boundary check by JVM 230, in accordance with an embodiment. In this example, JVM 230 inserts byte code 1.5 between byte code 1 and 2. This byte code 1.5 checks to determine if the array length is at least 0, and, if not, throws an AIOOBE. Otherwise, execution continues. If the array has no element, which, for this example, occurs when the user did not specify a command line argument, then JVM 230 will cause an exception to be thrown.

A try-catch block, e.g., provided by a programmer, can catch the exception thrown by JVM 230. FIG. 10 shows a source code 1000 with a try-catch block inserted into source code 700 of FIG. 7. FIG. 11 shows a textual byte code 1100 corresponding to the source code 1000 of FIG. 10. According to the exception table on line 1110, byte code 0-4 corresponds to the try block, and if there is an AIOOBE in between byte code 0-4, execution jumps to byte code 7. The end of try block (instruction 4) avoids the catch block and jumps directly to byte code 11

FIG. 12 shows byte code 1200 in which JVM 230 inserts a bounds check between byte code 1 and 2, represented by byte code 1.5, 1.6, and 1.7. FIG. 13 shows textual byte code 1300 corresponding to byte code 1200 as a result of using an embodiment of the invention. In this byte code 1300, the throw statement at byte code 4.6 of FIG. 12 has been replaced with the catch block represented by statement 4.6 to 4.8 corresponding to byte code 7-10 of FIG. 12. FIG. 14 shows textual byte code 1400 in which a goto statement has been inserted to byte code 1200 at line 4.6, directing execution to the catch block at line 7, in accordance with an embodiment.

Embodiments of the invention are advantageous over other approaches because, in various embodiments, invoking exception handler 23040 may be avoided as there is no execution of the throw clause, and, as a result, system performance can be improved.

Computer

A computer may run system 200, the JVM, embodiments in accordance with the techniques described in this document, etc. For example, a CPU (Central Processing Unit) of the computer executes program instructions implementing the JVM by loading the program from a CD-ROM to RAM and executes those instructions from RAM. The program may be software, firmware, or a combination of software and firmware. In alternative embodiments, hard-wire circuitry may be used in place of or in combination with program instructions to implement the described techniques. Consequently, embodiments of the invention are not limited to any one or a combination of software, firmware, hardware, or circuitry.

Instructions executed by the computer may be stored in and/or carried through one or more computer readable-media from which a computer reads information. Computer-readable media may be magnetic medium such as, a floppy disk, a hard disk, a zip-drive cartridge, etc.; optical medium such as a CD-ROM, a CD-RAM, etc.; memory chips, such as RAM, ROM, EPROM, EEPROM, etc. Computer-readable media may also be coaxial cables, copper wire, fiber optics, capacitive or inductive coupling, etc.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for handling an exception in a program, comprising:
   determining, while the program is executing, if the exception is qualified as excessive; and
   responsive to the determining that the exception is excessive and responsive to an occurrence of the exception:
   identifying a throw clause associated with the exception;
   identifying a catch clause associated with the exception;
   when the throw clause is about to be executed, causing instructions associated with the catch clause to be directly executed instead of going through the throw clause,
   wherein the identifying the throw clause, the identifying the catch clause and the causing instructions are performed while the program is executing rather than at compile-time.

2. The method of claim 1 wherein determining if the exception is excessive is based on a count that the exception is invoked.

3. The method of claim 1 wherein the throw clause is generated explicitly by a programmer or implicitly by a system.

4. The method of claim 1 wherein causing instructions associated with the catch clause to be executed is by replacing the throw clause with such instructions.

5. The method of claim 1 wherein causing instructions associated with the catch clause to be executed is by directing execution to such instructions.

6. The method of claim 1 wherein causing instructions associated with the catch clause to be executed is done in the native representation code if a dynamic compiler is involved and in the internal representation of byte code if the dynamic compiler is not involved.

7. A computer-readable storage medium embodying program instructions for performing a method for handling an exception, the method comprising:
   determining, while the program is executing, if the exception is qualified as excessive; and
   responsive to the determining that the exception is excessive and responsive to an occurrence of the exception:
   identifying a throw clause associated with the exception;
   identifying a catch clause associated with the exception;
   when the throw clause is about to be executed, causing instructions associated with the catch clause to be directly executed instead of going through the throw clause,
   wherein the identifying the throw clause, the identifying the catch clause and the causing instructions are performed while the program is executing rather than at compile-time.

8. The medium of claim 7 wherein determining if the exception is excessive is based on a count that the exception is invoked.

9. The medium of claim 7 wherein the throw clause is generated explicitly by a programmer or implicitly by a system.

10. The medium of claim 7 wherein causing instructions associated with the catch clause to be executed is by replacing the throw clause with such instructions.

11. The medium of claim 7 wherein causing instructions associated with the catch clause to be executed is by directing execution to such instructions.

12. The medium of claim 7 wherein causing instructions associated with the catch clause to be executed is done in the native representation code if a dynamic compiler is involved and in the internal representation of byte code if the dynamic compiler is not involved.

13. A system comprising:
   memory; and
   a processor configured by instructions retrieved from the memory to:
   execute a program; and
   during the execution of the program,
   select an exception based on a number of times that the exception is invoked, the exception associated with a catch clause; and
   causing cause instructions associated with the catch clause to be executed when the exception is about to be thrown, instead of allowing the exception to be thrown.

14. The system of claim 13 wherein the throwing the exception is provided implicitly by the system.

15. The system of claim 13 wherein the throwing the exception is provided by program instructions explicitly written by a programmer.

16. The system of claim 13 further comprising a dynamic compiler that compiles the instructions associated with the catch clause.

17. The system of claim 13 further comprising a dynamic compiler that, based on a threshold, compiles a method including instructions associated with the catch clause.

18. The system of claim 13 wherein the system runs Java execution environment.

* * * * *

UNITED STATES PATENT AND TRADEMARK OFFICE
CERTIFICATE OF CORRECTION

| | |
|---|---|
| PATENT NO. | : 7,877,740 B2 |
| APPLICATION NO. | : 11/152466 |
| DATED | : January 25, 2011 |
| INVENTOR(S) | : Virendra Kumar Mehta |

It is certified that error appears in the above-identified patent and that said Letters Patent is hereby corrected as shown below:

In column 8, line 48, in Claim 13, before "cause" delete "causing".

Signed and Sealed this
Twenty-first Day of June, 2011

David J. Kappos
*Director of the United States Patent and Trademark Office*